Figure 1:
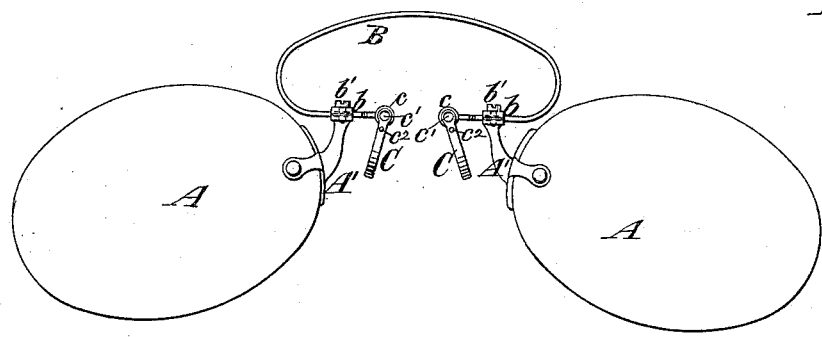

(No Model.)

W. S. WELLS.
NOSE GUARD FOR EYEGLASSES.

No. 382,848. Patented May 15, 1888.

Witnesses:
Emil Herter.
Henry J. McBride.

Inventor:
Walter S. Wells, M.D.
by his attys
Brown & Hall.

UNITED STATES PATENT OFFICE.

WALTER S. WELLS, OF NEW YORK, N. Y.

NOSE-GUARD FOR EYEGLASSES.

SPECIFICATION forming part of Letters Patent No. 382,848, dated May 15, 1888.

Application filed April 25, 1887. Serial No. 235,987. (No model.)

*To all whom it may concern:*

Be it known that I, WALTER S. WELLS, of the city and county of New York, and State of New York, have invented a new and useful Improvement in Nose-Guards for Eyeglasses and Spectacles, of which the following is a specification.

My invention relates more particularly to nose-guards for eyeglasses and spectacles which are so supported and arranged that they will grip or hold upon the loose skin or fold of tissue at the junction of the forehead and the nose, and will thus avoid any pressure upon the lachrymal glands or vessels located in that part of the nose upon which eyeglasses have commonly heretofore been supported. Such an arrangement of nose-pads is not here claimed, broadly, as it forms the subject of my application for Letters Patent, Serial No. 225,842, filed January 20, 1887.

In my improved glasses or spectacles each nose-pad is supported solely by an arm which extends from and beyond the post which connects the bow-spring with a glass or lens, it being usually connected with said arm by a ball-and-socket or other universal joint, and the arms may be formed by the projecting ends of the bow-spring, which extend beyond the posts in a substantially horizontal plane. The said arms are also or may be curved or bowed inward in a plane transverse to the plane of the glasses or lenses. Each pad is or may be made of a strip or wire bent into ring-like form and having its ends separated and formed as rings or cups to embrace a ball upon the end of the supporting-arm and having a screw for tightening the hold of the pad upon the ball.

The invention consists in novel combinations of parts, including constructions of parts, above referred to, and which are hereinafter pointed out in the claims.

Figure 2:
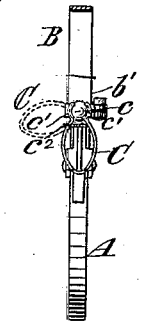
Figures 3, 4:
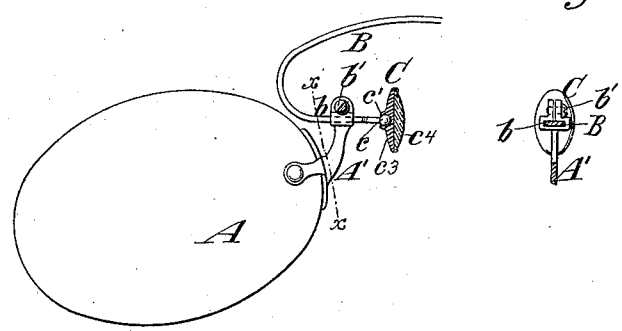
Figure 5:
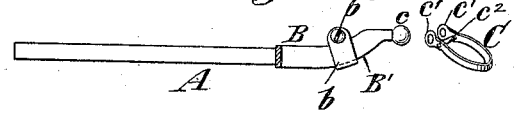
Figure 6:

In the accompanying drawings, Figure 1 represents a pair of eyeglasses embodying my invention. Fig. 2 is an edge view of one glass or lens, together with its appurtenances, the plane of section being taken through the bow-spring. Fig. 3 represents one glass or lens and a portion of the bow-spring and a sectional view of a pad of slightly-modified form. Fig. 4 is a sectional view upon the plane of the dotted line $x\ x$, Fig. 3, looking toward the right hand from said line. Fig. 5 is a plan of a glass or lens and a sectional view of a bow-spring and its post for supporting the glass or lens and including a view of a nose-pad detached from the spring; and Fig. 6 is a transverse section of the spring, showing the construction of the post wherein it is clamped.

Similar letters of reference designate corresponding parts in all the figures.

Referring first to Figs. 1 and 2, A designates the two glasses or lenses, and B the bow-spring, which is connected by suitable joints, $b$, with posts, arms, or brackets A′, projecting from the glasses or lenses. I have here shown the ends of the bow-spring as sliding in loops or mortises upon the posts or arms A′ at the points $b$, and the glasses or lenses may be secured at the proper focal distance apart by means of set-screws $b'$, inserted in the mortises or loops $b$. The mortises or loops $b$ may be open at the side, as best shown in Fig. 6, to provide for introducing the spring laterally into them, and the clamping-screws $b'$ may be inserted at the side of the spring to avoid perforating it. The end portions of the bow-spring are prolonged beyond the loops or mortises inward and toward each other, and I have here shown the bow-spring as having balls $c$ upon its ends.

The means shown for connecting the bow-spring B with the glasses or lenses A—that is, the loops or mortises $b'$—provides for adjusting the posts and glasses or lenses toward and from each other to vary the distances between the focal centers of the glasses.

The nose-pads C here represented each consists of a wire or strip of metal bent into ring-like form, as best shown in Fig. 5, and having concave ring-like ends $c'$, which grasp opposite sides of the ball $c$ and form in connection therewith a ball-and-socket joint, which is of course one species of universal joint. Each nose-pad C may have a small screw, $c^2$, extending between its opposite sides, and by which the ring-like ends $c'$ may be clamped upon the ball $c$ with sufficient pressure to necessitate the exertion of some force to adjust the nose-pads upon the balls to the desired position and hold them in place after adjustment. This method of supporting the nose-pads C enables them to be adjusted at any desired angle toward and from each other, and also permits them to be swung to any position desired in a plane transverse to the bow-spring and the plane of the glasses—as, for example, into position shown by dotted lines in Fig. 2. The nose-pads C are thus adapted to be adjusted into proper position to grasp and hold upon the fold of skin or tissue at the junction of the nose and forehead and above and forward of the bone of the nose, and out of the way of the lachrymal and other vessels, which might be injured by pressure upon them. The portions of the bow-spring which project beyond the posts or brackets A' may be considered as arms projecting from and beyond the posts or brackets and each forming the sole support of a nose-pad.

In the example of the invention shown in Figs. 3 and 4 a pad, C, consisting of a plate or disk, $c^3$, faced with cork, india-rubber, or other packing material, $c^4$, is supported by a ball and-socket joint, $c\ c'$, or other universal joint, upon the end of the bow-spring $b$, and provision is thus afforded for adjusting the pad in any direction, as may be desired. In this example of the invention the mortise or loop $b$, through which the bow-spring slides, is divided or split, as best shown in Fig. 4, and by means of a clamping screw, $b'$, it may be contracted upon the bow-spring, so as to hold the bow-spring and glasses or lenses A in the desired relative position.

In the example of my invention shown in Figs. 5 and 6 I have shown the ring-like nose-pad C detached from the end of the bow-spring to better illustrate its construction, and I have also shown the end portion of the bow-spring, which is received by the loop or mortise $b$ of the post A', as bowed or curved inward at B' in a horizontal plane, so as to bring the nose-pads inward of the plane of the glasses or lenses and enable them to more readily grasp the fold of skin and soft tissue at the junction of the nose and forehead.

What I claim as my invention, and desire to secure by Letters Patent, is—

1. The combination, in eyeglasses or spectacles, with the glasses or lenses, of arms extending substantially horizontally from and beyond the posts which connect the bow-spring with the glasses or lenses, and nose-pads secured one upon each arm by a universal joint, and of which said arms constitute the sole support, substantially as herein described.

2. The combination, in eyeglasses or spectacles, with a bow-spring the end portions of which are prolonged in a substantially horizontal plane beyond the posts which connect the spring with the glasses or lenses, of nose-pads, each having a universal-joint connection with the end of the bow-spring, whereby the pad is solely supported, substantially as herein described.

3. The combination, in eyeglasses or spectacles, with the glasses or lenses, of arms projecting from and beyond the posts which connect the bow-spring with the glasses or lenses, and terminating in balls $c$, and the nose-pads C, each consisting of a wire or strip of metal bent into ring-like form and having its ends separated and shaped in the form of rings or cups $c'$ to embrace the ball and form a joint therewith, and provided with an adjusting-screw, $c^2$, substantially as herein described.

4. The combination, in eyeglasses or spectacles, of a bow-spring having its end portions projecting in a substantially horizontal plane beyond the posts which connect it with the glasses or lenses, and each forming the sole support for a nose-pad, and the posts adjustable along the bow-spring to vary the distance of the glasses or lenses apart, substantially as herein described.

WALTER S. WELLS.

Witnesses:
C. W. LANGFORD,
F. S. WELLS.